Dec. 15, 1931.   M. J. PALMQUIST   1,836,681
AIRCRAFT CONTROLLING MEANS
Filed June 4, 1929   2 Sheets-Sheet 1
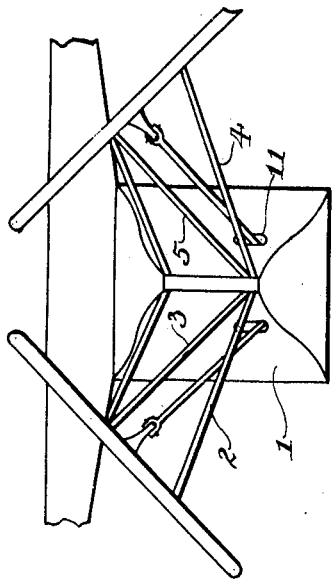
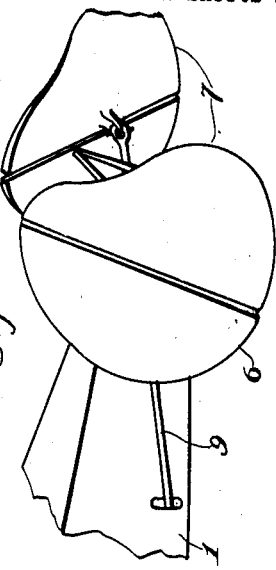
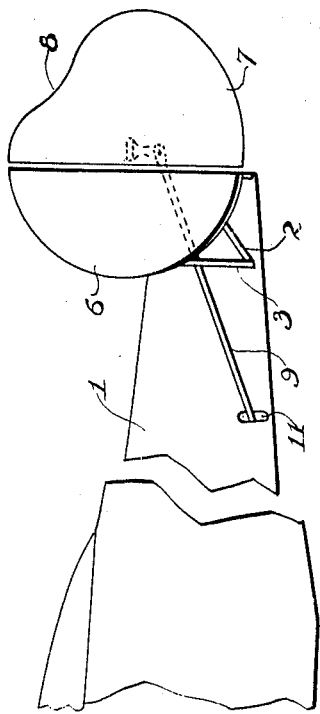
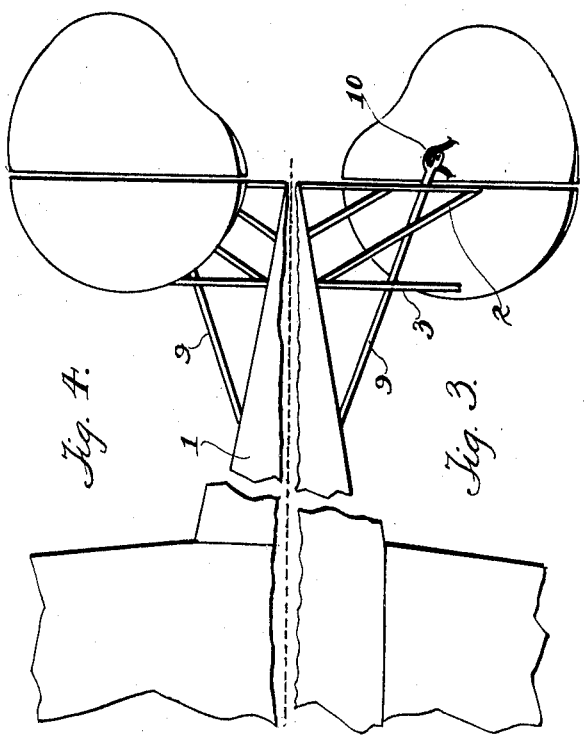
INVENTOR.
MAX J. PALMQUIST.
BY Darby + Darby
his ATTORNEYS.

Dec. 15, 1931. M. J. PALMQUIST 1,836,681
AIRCRAFT CONTROLLING MEANS
Filed June 4, 1929 2 Sheets-Sheet 2
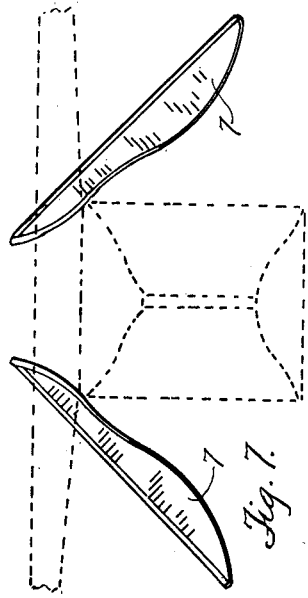
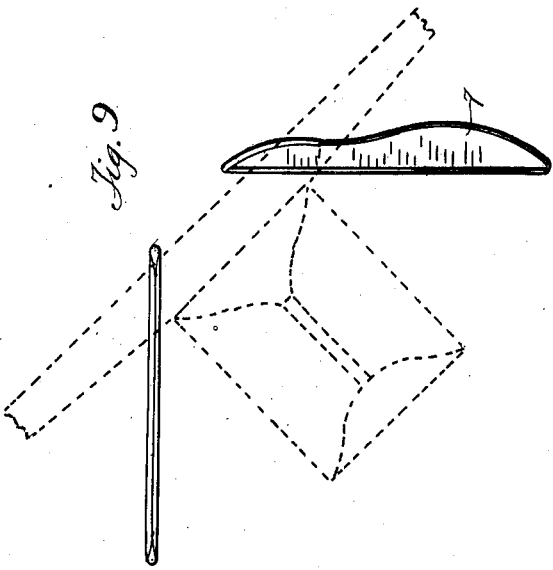
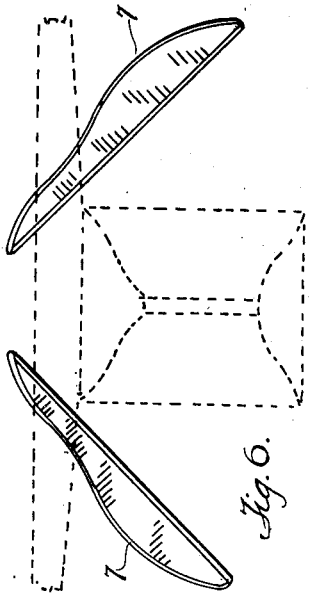
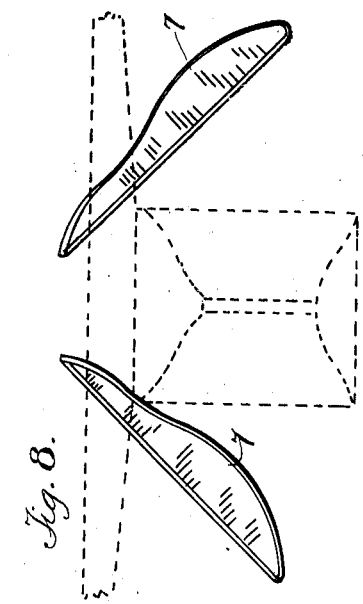
INVENTOR.
MAX J. PALMQUIST.
BY Darby + Darby
his ATTORNEYS.

Patented Dec. 15, 1931

1,836,681

UNITED STATES PATENT OFFICE

MAX J. PALMQUIST, OF CHICAGO, ILLINOIS

AIRCRAFT CONTROLLING MEANS

Application filed June 4, 1929. Serial No. 368,331.

This invention relates to aircraft devices and with particularity to means and methods for effecting equilibrium and control.

The principal object of the invention is to provide highly efficient and relatively simple means for controlling the orientation and equilibrium of air craft while in flight.

Another object of the invention is to provide an improved empennage for airplanes or the like.

As is well known in the art, the usual empennage structure comprises a vertical or directional control rudder, and one or more elevator flaps which may be moved in unison to control the vertical movement of the airplane.

In order to effect rolling or banking of the plane, the usual ailerons are manipulated independently of the vertical and directional steering flaps. Consequently during such banking movement the said flaps tend to oppose the banking, with the production of torsional stresses throughout the structure of the craft.

Accordingly it is a further object of the invention to provide means for banking an airplane or other aircraft wherein torsional stresses incident to banking are substantially eliminated.

A feature of the invention resides in an improved empennage for aircraft wherein the directional and steering control surfaces are supported at a distance from the body of the craft.

Another feature pertains to the method of controlling the vertical and directional steering of an aircraft by the manipulation of a single movable wing.

A further feature resides in a plurality of similar controlling fins for an empennage which are mounted so as normally to be at an angle with respect to the axis of pitch of the craft.

A still further feature relates to an empennage wherein a plurality of controlling flaps or aerofoils are capable of rotation about axes which are mutually perpendicular.

Other features and advantages not specifically enumerated will be apparent after a consideration of the following detail descriptions, and the appended claims.

Referring to the drawings wherein only that portion of an airplane is shown sufficient to enable the invention to be clearly understood:

Fig. 1 is a side view in elevation of the empennage structure according to the invention;

Fig. 2 is a rear view in elevation of the structure shown in Fig. 1;

Fig. 3 is a bottom plan view of one-half of the empennage structure;

Fig. 4 is a top plan view of one-half of the empennage structure;

Fig. 5 is a perspective view of the structure shown in Figs. 1 to 4;

Figs. 6, 7, 8 and 9 are detail studies showing the manner in which the control devices are positioned to effect different movements of the aircraft.

Referring to Figs. 1 to 5 of the drawings, the numeral 1 indicates generally the rear end of the fuselage of an airplane or any other equivalent type of aircraft. Supported on opposite sides of the portion 1, by means of suitable struts 2, 3, 4, 5, are the control devices according to the invention, each device or aerofoil comprising a substantially circular section 6 and another section 7 having a portion 8 partially cut away as shown. The section 6, 7 are hinged together for rotation relatively to each other. As shown in the drawings, each section 6 of the aerofoil is supported at a distance away from the fuselage 1, or body of the aircraft, by means of the struts 2 and 3, while the sections 7 are provided with operating rods 9, to which they are pivotally attached as indicated by the numeral 10; these operating rods passing through suitable openings 11 in the wall of the fuselage or body and terminating in any well known type of operating levers in the control room or cockpit.

For purposes that will appear hereinafter it is preferred to provide separate operating levers and mechanism for each of the movable sections 7 of the respective aerofoils.

As shown more clearly in Fig. 2, it will be seen that the fixed sections 6 of the aerofoils are mounted at an angle with respect to each other. While it has been found that this angle should be substantially a right angle to effect the best control, it will be understood that this particular angle is not at all a prerequisite to the achievement of the directional and steering controls of the aircraft, and therefore, these aerofoils may be mounted at any other angle that is found desirable. Furthermore, it has been found preferable to mount mutually perpendicular aerofoils on the respective struts, so that the bisector of the plane angle between the aerofoils is parallel to or in the same plane with the vertical axis of the craft. However, any other symmetrical disposition of the aerofoils may be utilized. In any event, it will be noted that because of the manner of supporting the aerofoils at a distance from the body of the aircraft a greater effective and more uniform pressure is produced on these aerofoils, since they are positioned in the path of the air stream where it is least disturbed by effects of the body or structure.

Referring to Figs. 6, 7, 8 and 9 of the drawings, the manner of effecting the horizontal directional and steering control of the aircraft by means of the aerofoils will now be described. Thus, as shown in Fig. 6, the movable sections 7 of each of the aerofoils is shown as having been moved by the associated operating levers to a slightly upward inclined position, whereby the nose of the aircraft is elevated. It being understood of course that the word upward in this connection is merely relative to the axis of the aircraft. Since the sections 7 are symmetrically disposed with respect to the vertical axis of the craft this upward inclination of the sections 7 does not disturb the horizontal direction of the craft. On the other hand, when it is desired to lower the nose of the craft for downward movement, the sections 7 are moved to a downward position as shown in Fig. 7. When it is desired to effect horizontal directional steering of the craft the movable sections 7 are moved to assume opposite positions with respect to the axis of the craft. For example, as shown in Fig. 8, the left hand movable section 7 has been operated to a downwardly inclined position while the right hand section has been operated to an upwardly inclined position, as the result of which the effect of a right hand rudder is produced and the nose of the craft is turned towards the right. It will be obvious then that in order to turn the craft toward the left that the respective sections 7 should be moved in the opposite relation to that shown in Fig. 8.

When it is desired to produce combined rudder and elevator effect it is simply necessary to manipulate the movable sections independently of each other. For example, when as shown in Fig. 9, the left hand aerofoil is normal and the right hand movable section 7 is raised the combined effect of turning towards the right and the elevating of the nose of the craft are produced. It will be obvious, therefore, that any combined rudder and elevator effect may thus be produced.

The diagram of Fig. 8 represents the aircraft in a banked position of approximately 45°, and ready to make a right turn. In order to bring the craft into the banked position shown the usual right hand aileron would be raised and the left aileron lowered and the right hand movable section of the aerofoil 7 is raised while the left hand movable section is either normal or slightly lowered. Thus the movements of the respective section of the right and left aerofoils may correspond to the movements of the ailerons. Consequently the banking movement of the craft does not tend to produce torsional strains in the body of the craft as is the case when the ordinary type of vertical rudder and horizontal elevator flaps are employed.

While in the foregoing specific apparatus and dispositions thereof are disclosed for effecting the broad objects of the invention, it will be understood that various changes may be made without departing from the spirit and scope of the invention. For example, while a single set of aerofoils are employed, it will be understood that a plurality of such sets may be used. Furthermore while the control devices are shown as applied to the control portion of an airplane, it will be understood that they are equally well applicable to the corresponding portion of any other equivalent type of aircraft. Likewise the aerofoils may be disposed at any other portion of the body of the craft, as is well known in the art, and finally, it has been found that while the particular shape shown for the movable sections is probably the most advantageous, any other shape may be employed, and further, instead of making one section of the aerofoil fixed with respect to the body of the craft, and the other section movable, the reverse may be employed, or it may even be found useful to make both sections of each aerofoil movable.

What is claimed is:

1. In an aircraft structure, a pair of direction-controlling fins disposed on opposite sides of the longitudinal axis of the structure, each fin having a fixed section and a movable section, and means for moving said movable sections independently to control the movement of said aircraft about two or more axes, the fixed section of the fins being at right angles to each other.

2. In an aircraft structure, a pair of direction-controlling fins disposed on opposite sides of the longitudinal axis of the structure, each fin having a normal position at an angle to the axis of the aircraft, and means for moving said fins independently with respect to said axis, said fins being normally at right angles to each other.

3. An aircraft structure according to claim 2, wherein each fin comprises a fixed section and a movable section.

4. In an empennage structure for airplanes, a pair of direction-controlling fins disposed on opposite sides of the longitudinal axis of the airplane, each fin having a section mounted for independent rotation about an axis in a different plane from the axis of the airplane body, said fin sections being normally at right angles to each other.

5. In an aircraft structure, means for controlling the direction of movement of the aircraft including a pair of fins mounted for rotation about axes which are in substantially the same plane, at right angles to each other, and means for rotating said fins independently of each other.

6. An aircraft structure according to claim 5, in which said axes each make an angle of 45° with the vertical axis of the machine.

7. An aircraft structure according to claim 5 in which said axes are at right angles to each other.

8. In an airplane structure, the combination of an airplane body, and a pair of independently movable direction-controlling fins mounted parallel to but non-coincident with the axis of said body and each capable of rotation about an axis which is at an angle to said body axis.

9. In an aircraft structure, a body portion and direction-controlling means including a movable fin mounted on each side of said body but at a distance therefrom, each fin comprising a fixed section and a movable section, and means for moving said movable sections independently of each other.

10. In an aircraft structure a body portion, and direction-controlling means including a pair of fins each having a fixed section and a movable section, both of said fins being mounted at a distance from said body, and means within said body for independently varying the position of the movable sections with respect to each other.

11. An aircraft structure according to claim 10 in which each movable section is independently movable from within the body.

12. An empennage structure for airplanes comprising a pair of fixed fins, struts upon which said fins are mounted at a distance from the airplane body, a movable fin for each fixed fin adapted to be rotated about a line in the plane of the fixed fin, and means for independently varying the angle between each fixed fin and the associated movable fin to control the movement of the airplane about a plurality of co-ordinate axes.

13. An empennage structure for airplanes or the like, comprising a direction-controlling fin normally mounted at an angle of 45° with respect to the vertical axis of the airplane, said fin having an independently movable section with a cutaway trailing edge.

14. An empennage structure according to claim 13 in which the fin has a fixed section and a movable section and means for changing the angle of said movable section with respect to the axis of the airplane.

15. An empennage structure for airplanes or the like comprising a direction controlling fin mounted at each side of the airplane, the planes of said fins being normally perpendicular to each other, said fin having an independently movable section with a cut away trailing edge.

16. A direction controlling fin for aircraft comprising a substantially semi-circular section and another section horizontally united to the first section, said other section having its outer edge defining a reversely curved line.

17. In an aircraft structure, means for varying the direction of movement of the aircraft including a pair of fins mounted on opposite sides of the longitudinal axis of the structure and at right angles to each other, each fin being provided with a movable section and means for moving the movable sections of the fins independently of each other.

18. In an aircraft structure, a body portion and direction controlling means including a pair of fins each mounted on opposite sides of the longitudinal axis of the structure and at a distance from the body thereof, said fins being normally at right angles to each other, and means for moving portions of the fins independently of each other.

In testimony whereof I have hereunto set my hand on this 20th day of May, A. D. 1929.

MAX J. PALMQUIST.